United States Patent

[11] 3,568,662

| [72] | Inventors | Donald B. Everett<br>Belmont;<br>Louis W. Schlenz, Sunnyvale, Calif. (931, Commercial St., Palo Alto, Calif. 94303) |
|---|---|---|
| [21] | Appl. No. | 651,737 |
| [22] | Filed | July 7, 1967 |
| [45] | Patented | Mar. 9, 1971 |

[54] METHOD AND APPARATUS FOR SENSING BIOELECTRIC POTENTIALS
15 Claims, 7 Drawing Figs.

| [52] | U.S. Cl. | 128/2.06 |
|---|---|---|
| [51] | Int. Cl. | A61b 5/04 |
| [50] | Field of Search | 128/2.05, 2.06, 2.1, 2 |

[56] References Cited

UNITED STATES PATENTS

| 2,098,695 | 11/1937 | Southwick | 128/2.06X |
|---|---|---|---|
| 3,029,808 | 4/1962 | Kagan | 128/2.06 |
| 3,139,085 | 6/1964 | Custance et al. | 128/2 |
| 3,187,745 | 6/1965 | Baum et al. | 128/2.06 |

FOREIGN PATENTS

| 132,204 | 3/1933 | Austria | 128/2.1 |
|---|---|---|---|
| 662,033 | 7/1938 | Germany | 128/2.1 |
| 388,607 | 3/1933 | Great Britain | 128/2.1 |

OTHER REFERENCES

American Journal of Medical Electronics Oct.-Dec. 1964; pgs. 261— 265.

*Primary Examiner*—Delbert B. Lowe
*Attorney*—Townsend and Townsend

ABSTRACT: A method and apparatus for sensing bioelectric potentials utilizing a passive, capacitive coupling to the body and establishment by such capacitive coupling of an electrical signal representative of the body potential at the site of such capacitive coupling. The capacitive coupling includes an electrode member and a solid dielectric between the member and a body. In one example, a semiconductor device can serve the function of electrode member and its dielectric and include provision for changing the bias of the device to change the thickness of the dielectric or the effective area of the electrode member. A pair of passive capacitive electrode couplings to the body are provided with the respective outputs connected to a differential amplifier. The electrode can be formed in the configuration of a needle for measuring intercellular potentials.

TO RIGHT LEG

CAPACITIVE ELECTRODE

DIRECT CONTACT ELECTRODE

HAND SLAPPING OF ELECTRODE AT ~3Hz

BASE LINE SHIFT

INVENTORS
DONALD B. EVERETT
LOUIS W. SCHLENZ

BY
ATTORNEYS

INVENTORS
DONALD B. EVERETT
LOUIS W. SCHLENZ
BY Townsend and Townsend
ATTORNEYS

METHOD AND APPARATUS FOR SENSING BIOELECTRIC POTENTIALS

The present invention is directed to method and apparatus for sensing bioelectric potentials and, particularly, to a capacitive-type electrode for sensing bioelectric potentials or signals.

Broadly stated, the present invention, to be described in greater detail below, is directed to method and apparatus for detecting bioelectric potentials, the apparatus including at least one electrode member, a substantially electrically nonconducting region between the electrode member and the body and a signal-producing system connected to the electrode member for producing a signal representative of the potential on the electrode member in variable accordance with body potentials. The term "body" is used herein and in the appended claims to mean any biological member or portion thereof including animal, human, plant, organism or cell exhibiting electrical potentials for measurement. The present invention can be utilized in a wide number of applications, typical clinical and research applications including electrocardiography (EKG), electroencephalography (EEG), electromiography (EMG), and electrical optokinetics.

In the past, clinical and research measurements of body potentials, such as of the type mentioned above, have been performed with direct contact resistively coupled electrodes in a variety of forms and wherein direct electrical contact is made with the body. Due to the direct contact between the electrode and the body and the chemical nature of both the electrode and the body, numerous problems exist with the use of direct contact electrodes. These problems include polarization, partial rectification, chemical reaction, noise and contact or movement artifacts.

The major problems that exist in the use of contact electrodes stem from the chemical nature of the electrode itself, and the manner in which electric communication is made between the electrode and the body. Changes in the chemical nature of the surface of the electrode and changes in the chemical makeup of the adjacent region of the body result in effects that, at least partially, mask the true body potential sought to be detected. Typical problematic changes with time are the drying out of the paste typically used with direct contact electrodes and the variation of body surface resistance due to factors such as body perspiration occasioned by physical exertion of a patient. Also, during extended applications of a direct contact electrode to a body such as to the body of an astronaut in a space flight, it has been discovered that the noise increases to an unacceptable level after a certain length of time, presumably due to a change in the chemical nature of the electrode.

In the case of the capacitive coupling method and apparatus in accordance with the present invention the electrically nonconducting region avoids the effects produced with direct contact electrodes and the resultant problems presented thereby. In the capacitive electrodes of the present invention, the nonconducting region is formed of a chemically inert and electrically stable substance.

The capacitive electrode in accordance with the present invention is more efficient than a direct contact electrode because the capacitive electrode cannot cause chemical reactions to occur at the expense of bioelectric energy. Likewise the capacitive electrode cannot release energy previously stored in chemical reactions so as to modify a bioelectric signal. All direct contact electrodes, on the other hand, suffer to a significant degree from this defect of chemical reactions.

In the case of direct contact electrodes, including the so-called "nonpolarizable" direct contact electrodes, a significant degree of polarization results. This polarization produces an error in the detected body potentials. Additionally, such polarization makes it impossible to measure extremely minute changes in body potentials and makes it particularly difficult to make an accurate determination of ventricular gradient. In the capacitive electrodes in accordance with the present invention and the method performed in utilizing these electrodes, the electrically nonconducting region cannot generate a potential of its own due to electrochemical reactions so as to polarize the area of detection. These capacitive electrodes even permit a more accurate determination of ventricular gradient.

While all direct contact electrodes suffer from a small but significant degree of rectification, the capacitive electrode cannot by its nature act as a partial rectifier. The capacitive electrodes of the present invention cannot pass current more easily in one direction than the other since the transfer of energy in the capacitive electrode is be means of an electrostatic field rather than the flow of ions or electrons through a conductor.

Although there is a certain loss of signal energy in the capacitive electrode due to heat developed in the dielectric, this loss follows theory very closely. However, the losses and additions of signal strength of direct contact electrodes are not predictable. Furthermore, the capacitive electrode will typically use less electric energy from the biological source to measure a given potential than does a contact electrode. Less energy is used since, by its nature, the capacitor is an efficient energy storage system and does not dissipate any measurable amount of energy in the frequency range of biological signals.

Another feature and advantages of the capacitive electrode in accordance with the present invention lies in the fact that less noise is generated in the use thereof than in the use of direct contact electrodes for the reason that in the capacitive electrode there is no continuous flow of electrons or ions between the skin or other biological tissue and the electrode through a conductive medium or electrolyte and no chemically active interface boundaries at the skin or other tissues. Rather an inert dielectric separates the electrode from the tissue and charge is induced electrostatically across the dielectric without the necessity of charge carriers passing continuously through it. Furthermore the internally generated potentials are transmitted in the body or tissue primarily by the intercellular capacitance of the tissue rather than by direct current, particularly in skin adjacent the electrode. The only noise that the capacitive electrode senses is the thermal tissue noise of the organism.

Still another feature and advantage of the capacitive coupling electrode lies in the fact that no contact artifacts or movement artifacts are produced as is typical in the case of direct contact electrodes. Although the reasons for contact artifact and movement artifact in contact electrodes are not fully understood, factors known to contribute to these artifacts include the change in resistance with change in applied pressure, the change in distribution of the conducting ions caused by shearing and the distortion of the electrode during movement. One of the most common difficulties in recording EKG and EEG signals in the baseline shift or baseline instability due to these artifacts. In the case of the capacitive electrode, the amount of energy stored on the electrode at a given moment is a function of the capacity of the electrode to body capacitive coupling and the magnitude of the bioelectric potential at the electrode site. Since the capacity of the capacitive electrode to body coupling is a function of the electrode area, the dielectric thickness and dielectric constant, as long as these factors are properly controlled no baseline shift or other movement artifact results from movement or changes in mechanical pressure applied to the electrode or surrounding area.

Another feature and advantage of present invention is the absence of possible skin irritation often present with direct contact electrodes. The electrode is separated from the skin by an inert dielectric so that reaction of body acids with metal and the irritation of electrolytes is avoided. This arrangement also eliminates varying half-cell potentials produced by metal in contact with skin.

Still another feature and advantage of the present invention lies in the fact that the capacitive electrodes isolate the body from possible electrical shock that might be caused by some malfunction of the signal read out and display equipment.

In accordance with still another aspect of the invention the capacitive electrode can be formed by using a semiconducting material and forming the electrically nonconducting region intimately therewith. For example, oxygen can be diffused into a doped silicone member.

In accordance with another aspect of the present invention, the capacity of the capacitive electrode can be varied in a systematic precise way to permit measurement of body potentials down to DC thereby increasing the accuracy of ventricular gradient determination.

Other objects, features and advantages of the present invention will become apparent upon reading the following specification and referring to the accompanying drawings in which similar characters of reference represent corresponding parts in each of the several views.

Figure 2:
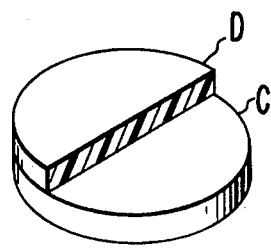
FIG. 2 is an enlarged perspective view partially broken away in section of one of the electrodes schematically illustrated in FIG. 1.
Figure 7:
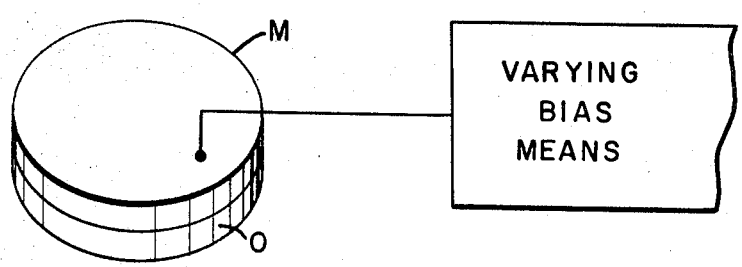
Figure 6:
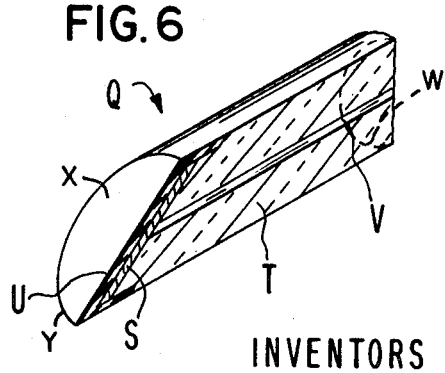

FIG. 6 is an enlarged perspective view partially in section of a capacitive electrode constructed in accordance with still another embodiment of the invention; and FIG. 7 is a diagrammatic view of an electrode similar to that shown in FIG. 2 with a semiconducting layer M and an insulative layer 0 with means for applying a varying bias to vary the depth of the depletion layer and hence the capacitive coupling.

Figure 1:
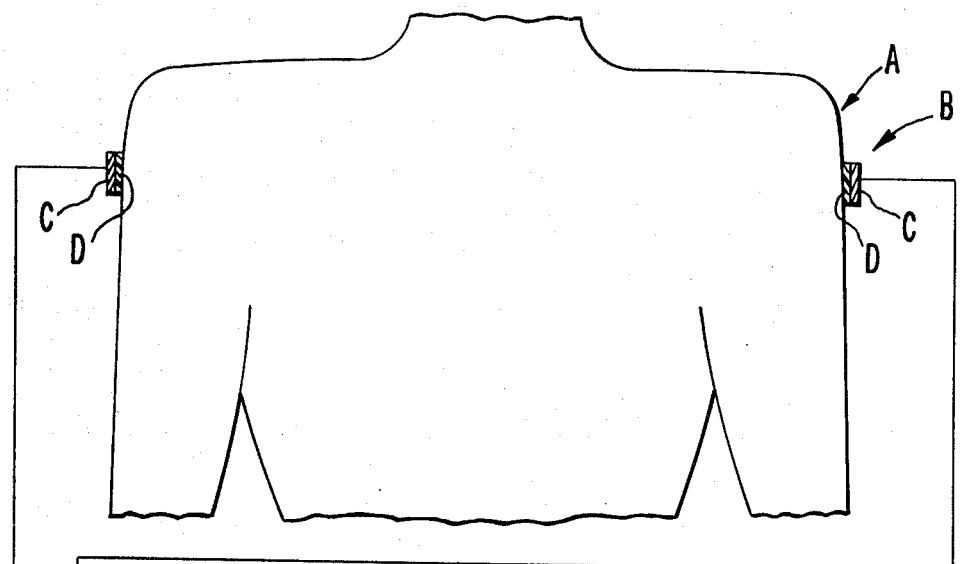
FIG. 1 is a schematic view partially in block diagram form and partially in section illustrating use and operation of the invention.

Referring now to the drawing with particular reference to FIG. 1, there is shown a schematic illustration of the construction and operation of the present invention on a body schematically illustrated as a human torso A. As pointed out above, the word body is defined broadly and the present invention is useful for measuring many forms of bioelectric potentials.

Positioned against body A are capacitive electrodes B which include, as illustrated, an electrode member C and a nonconducting region D between the electrode member C and the body A. As will appear in greater detail below, the electrode member C may be of any geometrical configuration that a particular application may demand. It can be of any electrically conductive substance, the choice of material depending upon production or fabrication expediency and the intended application, including the particular type of signal to be detected and the environment in which the signal is to be detected.

The electrically nonconducting region D can be formed in a number of different ways, so long as the actual spacing between the electrode member C and the body A is controlled. For example, the region D can be established by an insulating material such as Teflon, nylon, silicone dioxide, polyethylene, or polyvinylidine chloride. This insulating material-forming region D can be secured to the electrode member C, and is typically deposited on the broad surface of the electrode member C in an accurately controlled thickness.

In accordance with one aspect of the present invention the capacitive electrode can be formed from a doped silicone wafer into one surface of which oxygen is diffused for producing a silicone dioxide layer that will serve as the insulating region of the capacitor. Electric contact can be made with the doped silicone electrode member in any number of well-known ways such as by means of a thin aluminum coating. The capacitance of such a capacitor can be varied by controlling the amount of oxygen diffused into the silicone wafer. By way of example, a disc shaped capacitor having a broad surface one centimeter square can be produced in accordance with this aspect of the present invention and having a capacitance of 35 microfarads and a breakdown voltage of 600 volts per micron.

The capacitive electrodes B are electrically connected in circuit for producing a signal representative of the potential on the electrode members C in variable accordance with the body potentials at the sites of the capacitive electrodes. In the embodiment illustrated, the electrode member C of each of the two capacitive electrodes B is connected to a differential amplifier E which has an input resistance R and which is in turn connected to a recording or display instrument such as an oscilloscope F for display of the EKG signal G. There may be a common input grounded to the subject. (Traditionally, the right leg of the subject is used.)

The actual number of capacitive electrodes utilized and their placement on the body can be selected in accordance with known techniques for measuring body potentials such as those used in EKG measurement utilizing direct contact electrodes.

A perspective view partially broken away of a typical construction for the capacitive electrode B is shown in FIG. 2.

Figure 3:
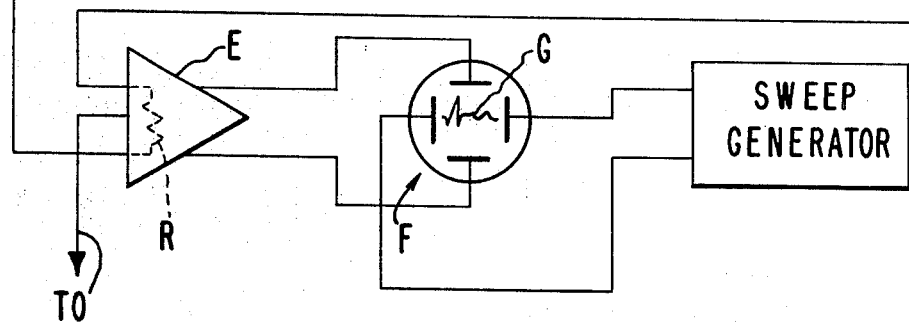
FIG. 3 is a curve tracing showing recordings of EKG signals of the same subject using capacitive electrodes in accordance with the present invention and direct contact electrodes in accordance with the prior art and with the application of certain indicated disturbances.
Figure 3:
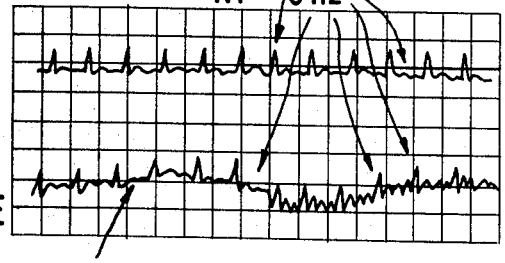

As an example of the superior performance of a capacitive electrode, FIG. 3 is an illustration of EKG recordings taken from the same patient with capacitive electrodes in accordance with the present invention and with contact electrodes. While the signals were being recorded, certain indicated disturbances were produced. Besides the typical baseline shift characteristic of direct contact electrode recordings and not present with capacitive electrode recordings, the marked effect of the disturbances upon direct contact electrode recordings will be appreciated in distinction with little or no effect upon capacitive electrode recordings.

The capacitive electrode tracings of FIG. 3 were produced using disc-shaped stainless steel electrode members about one-sixteenth inch and 3 centimeters in diameter covered with a polyvinylidine chloride insulating material one one-thousandth inch thick and having a dielectric constant of about 3 at frequencies below $10^6$ Hz. The electrode members were connected to a 2A 61 Tektronix Biomedical differential preamplifier, modified to have a 1,000 megohms input resistance, connected in turn to a Tektronix Model 564 oscilloscope.

The direct contact electrodes utilized were 1-inch diameter stainless steel discs held in place on EKG-SOL cream with an elastic band. These electrodes were connected to the same differential amplifier and display instruments as the capacitive electrodes.

The lower frequency limit of a bioelectric signal whose amplitude can be accurately measured with a simple capacitive electrode and an amplifier with a "flat" frequency response is a function of the capacity of the capacitive electrode and amplifier input impedance. As the capacity of the electrodes and the resistance of the amplifier are increased, lower bioelectric signal frequencies can be measured accurately. For example, if the effective capacity of the two electrodes B in series with the body shown in FIG. 1 is 0.1 microfarad and the differential input impedance of the amplifier E is 1,000 megohms, the frequency response will be down 3D to one one-hundredth Hz. This frequency response is 10 times superior to the typical low frequency response figure, i.e., one-tenth Hz., for commercially available EKG equipment using direct contact electrodes. This one-tenth Hz. limitation is a necessary compromise dictated by the inherent quality of the direct contact electrode, such as the above mentioned artifacts.

The lower frequency limit of a capacitive electrode with a given capacity and an amplifier with a given input resistance can be extended by tailoring or modifying the circuit of the amplifier to emphasize increasingly the low frequencies in the proper amount to offset or compensate for the rolloff in frequency response at low frequencies for the electrode capacity-amplifier input impedance combination.

Figure 4:
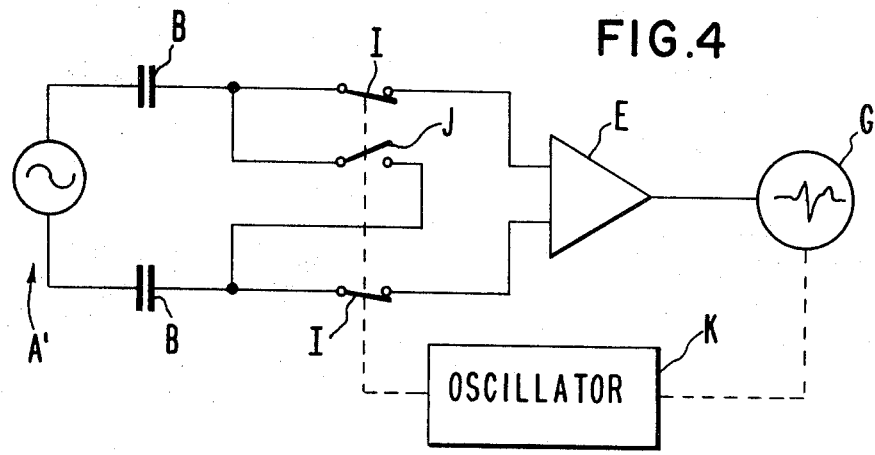
FIG. 4 is a schematic circuit diagram partially in block diagram form illustrating another embodiment of the invention.

Another way of lowering the frequency response of capacitive electrodes is to switch the connections of the electrodes to the amplifier as shown in FIG. 4. FIG. 4 is a schematic illustration of a switching circuit for the capacitive electrodes wherein the body is schematically illustrated as a signal generator A' and the capacitive electrodes B are connected from the signal generator A' through switches I to the differential amplifier E. A shorting switch J is provided for connecting the two electrode members of electrodes B together when the switches I are open to equalize potentials, thereby chopping the differential to zero. Phase coherent demodulation switching is produced with switches I and oscilloscope G. This switching or chopping function can be accomplished either mechanically, such as with a vibrating reed, or electronically, using any one of a number of well-known techniques such as with an oscillator K.

Measurements of body potentials in lower frequencies even down to direct current or DC voltages can be effected by varying systematically and precisely the capacitance of the capacitive electrodes.

The capacitance of the capacitive electrodes can be changed by varying the dielectric constant at a given rate and given amount, by changing the spacing between the electrode member and the body, such as by changing the thickness of the electrically insulating material, or by varying the area of the electrode members.

Figure 5:
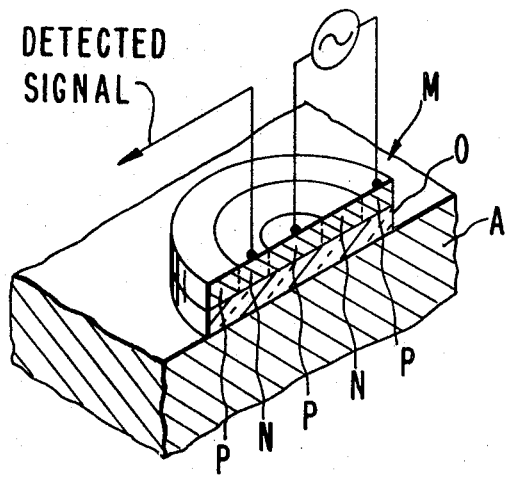
FIG. 5 is a cross-sectional view of a capacitive electrode in accordance with still another embodiment of the present invention.

In FIG. 5, there is shown a semiconductor device which can serve as the capacitive electrode and be variable in capacitance. As illustrated there in cross section, a disc-shaped semiconductor member M is provided having an insulating region O such as silicone dioxide adjacent the body A and concentric annular P, N and P type regions overlying insulating region O opposite body A. By applying a signal between the P regions in accordance with a chopper frequency, the size of the N region between the P regions can be varied effectively to change the effective area of the "electrode member" formed by the N region and hence change the capacitance of electrode M.

Instead of the semiconductor device as shown in FIG. 5 wherein the effective area of the electrode member is changed to change the capacity, the capacitance can be varied by varying the effective depth of the depletion layer by a precise systematic and rapid change in the bias, as shown in FIG. 7. An electrode performing this function can be formed by way of example in the configuration of FIG. 2, D being the semiconductor layer and C being a dielectric material layer. A varying bias applied to D varies the depth of the charge depletion layer at the interface of layers C and D, thereby varying the effective thickness of the nonconducting layer and the capacitance. This technique, as well as the technique of changing the capacitive electrode area, lowers the effective impedance of the skin at the site under the electrode. By use of the variable capacitance electrodes as described above, measurements can be made of body potentials down to DC so as to more accurately determine ventricular gradient in electrocardiography as artifacts and electrochemical reactions without the presence of the disturbing influences typically occuring in the use of direct contact electrodes and masking the true DC potentials.

While the invention has been described thus far with reference to a flat electrode member for the capacitive electrode, other configurations are possible. By way of example, FIG. 6 illustrates a type of capacitive electrode Q that can be utilized to measure intercellular potentials. As shown in FIG. 6, the electrode is formed by a thin electrode member S on a diagonally sharpened end of a rod T of insulating material such as glass. The rod T is generally arcuate in cross section as shown by dotted line W and the tip of the rod has been cut at an angle to form an elliptical face X and sharp needle tip Y for insertion into biological tissue. This electrode member S is covered with an insulating material U which defines a nonconducting region over the entire electrode member S. A wire lead V extends axially of the rod T to connect the electrode member S to read out instruments for measuring body signals.

The capacitively coupled electrode is described herein and in the claims as "passive" in the sense that it is used to electrostatically detect and read out a signal or potential originating internally within the biological tissue rather than for inducing a signal within the tissue or for externally applying energy for measuring some physical or chemical characteristic of the tissue.

While several embodiments of this invention have been shown and described, it will be apparent that other adaptations and modifications can be made without departing from the true spirit and scope of the invention.

We claim:

1. Apparatus for detecting bioelectric potentials comprising at least one electrode means for providing a substantially electrically nonconducting region of solid dielectric material between said electrode and a body, said electrode and solid dielectric region comprising a unitary member, and means electrically connected to said electrode for producing a signal representative of the potential electrostatically induced on said electrode in variable accordance with body potentials originating within the body.

2. The apparatus in accordance with claim 1 including a pair of such electrodes and associated nonconducting regions and wherein said signal-producing means includes a differential amplifier.

3. The apparatus in accordance with claim 1 including means for changing the electrical relationship of said electrode and the associated nonconducting region to change the electrical capacitive coupling of said electrode member with respect to the body.

4. The apparatus in accordance with claim 3 wherein said capacitive coupling changing means includes means for changing the effective thickness of said electrically nonconducting region.

5. The apparatus in accordance with claim 3 wherein said capacitive coupling changing means includes means for changing the effective area of said electrode.

6. The apparatus in accordance with claim 5 wherein said electrode is formed of a semiconductive material including regions of opposite type and wherein said capacitive coupling changing means includes means for applying a signal between regions of said semiconductive material for changing the effective area of one of said regions having a surface portion adjacent to said nonconducting region.

7. The apparatus in accordance with claim 1 including means for changing the effective capacitance of said electrode and said nonconducting region relative to the body.

8. Apparatus for detecting bioelectric potentials originating internally within a body or biological tissue comprising a pair of electrode members, means for providing a substantially electrically nonconducting region between each of said electrode members and a body with said electrode members passively capacitively coupled to the body, said means comprising a solid dielectric, a differential amplifier, means electrically connecting said electrode members to said differential amplifier and a readout means connected to said differential amplifier for producing a waveform representative of the internally generated body potentials.

9. The apparatus in accordance with claim 8 including means for changing the effective capacitive coupling of said electrode members and nonconducting region providing means to said body.

10. The apparatus in accordance with claim 9 wherein said capacitive coupling changing means includes means for changing the thickness of said electrically nonconducting region.

11. The apparatus of claim 9 wherein said capacitive coupling changing means includes means for changing the effective area of said electrode members adjacent said nonconducting regions.

12. The method of measuring bioelectric potentials comprising the steps of passively capacitively coupling to a body at least at one location thereon, by means including a solid dielectric, and electrostatically deriving an electrical signal representative of the internally generated body potential originating within the body at said location.

13. The method of measuring bioelectric potentials comprising the steps of: passively capacitively coupling to a body at least at two spaced-apart locations by means including a solid dielectric, establishing electric potentials representative of the internally generated body potentials at said locations, and combining said representative potentials to produce an output signal representative of internally generated body potentials between said spaced apart locations.

14. The method in accordance with claim 13 wherein the comparison of the established body potentials includes the step of causing electrons to flow toward and away from the capacitive coupling without affecting the body potential at the site, thereby allowing measurement of body potentials down to and including DC.

15. The method in accordance with claim 14 wherein said step of causing electrons to flow includes the step of varying the capacitive coupling.